United States Patent [19]

Nemoto et al.

[11] Patent Number: 4,594,615

[45] Date of Patent: Jun. 10, 1986

[54] STILL IMAGE REPRODUCING APPARATUS

[75] Inventors: Shoji Nemoto; Hiroshi Yoshioka, both of Kanagawa, Japan

[73] Assignee: Sony Corporation, Tokyo, Japan

[21] Appl. No.: 526,063

[22] Filed: Aug. 24, 1983

[30] Foreign Application Priority Data

Aug. 31, 1982 [JP] Japan .................................. 57-151206

[51] Int. Cl.$^4$ .............................................. G11B 21/10
[52] U.S. Cl. ...................................... 360/10.2; 360/77
[58] Field of Search .................................. 360/77, 10.2

[56] References Cited

U.S. PATENT DOCUMENTS 4,297,733 10/1981 Sanderson ............................ 360/77
4,309,730 1/1982 Sanderson ............................ 360/77
4,439,799 3/1984 Haubrich ........................... 360/10.2

*Primary Examiner*—Alan Faber

*Attorney, Agent, or Firm*—Lewis H. Eslinger; Alvin Sinderbrand

[57] ABSTRACT

Apparatus for controlling tracking position of a magnetic head for reproducing signals recorded as a series of slanted parallel tracks on a magnetic tape, the parallel tracks contain a video signal and a pilot signal of mutually different frequencies that change cyclically from track-to-track. A reference pilot signal having the same frequency as the frequency of the pilot signal reproduced from the track is generated, and the frequency of the reference pilot signal associated with one track is subtracted from the frequency of the pilot signals reproduced from the tracks adjacent the one track, so as to produce a control signal indicative of head displacement relative to the one track to be reproduced. In a still picture reproducing mode, first and second reference pilot signals are alternately generated that have the same frequency as the pilot signals that were recorded in the pair of tracks to be reproduced in the still picture mode.

13 Claims, 49 Drawing Figures

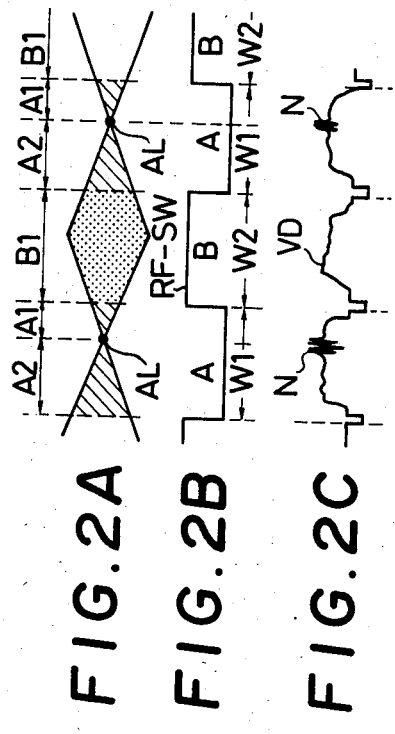
FIG.2A
FIG.2B
FIG.2C
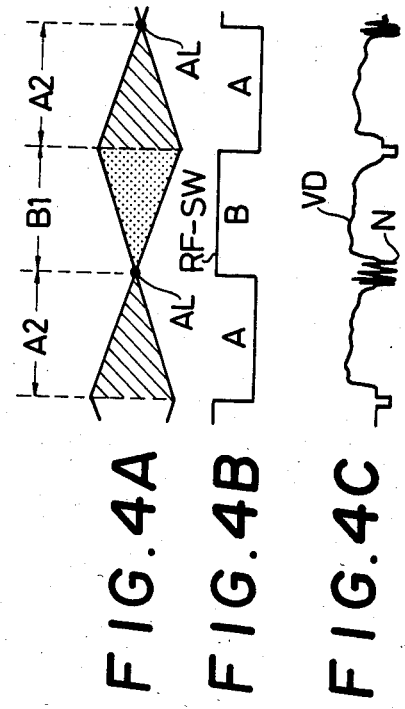
FIG.4A
FIG.4B
FIG.4C
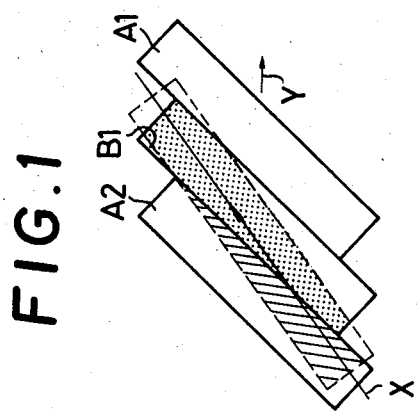
FIG.1
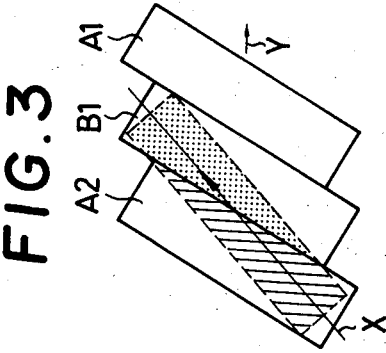
FIG.3

FIG.7A
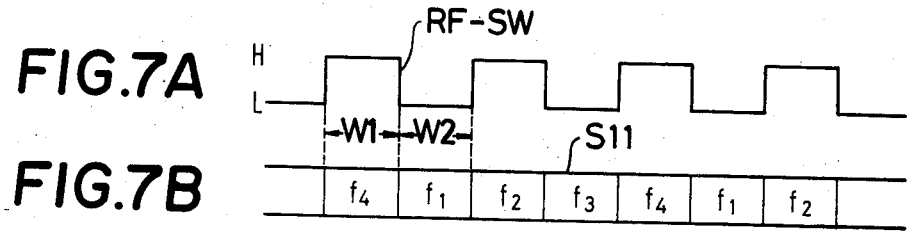
FIG.7B
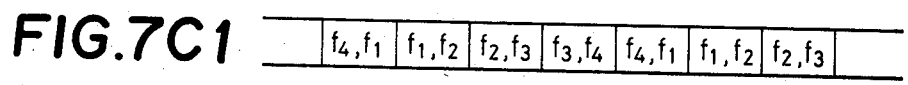
FIG.7C1
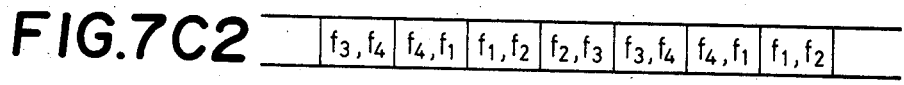
FIG.7C2
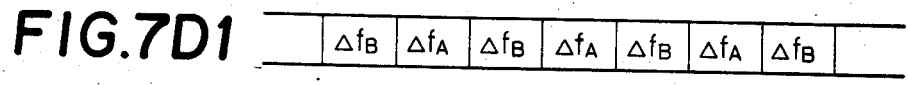
FIG.7D1
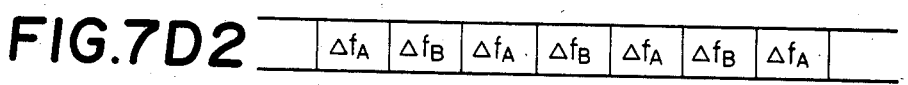
FIG.7D2
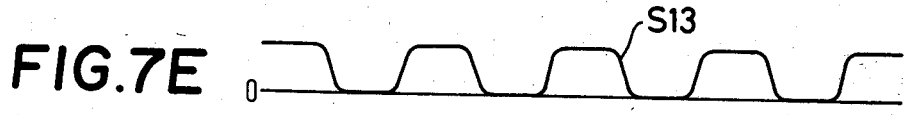
FIG.7E
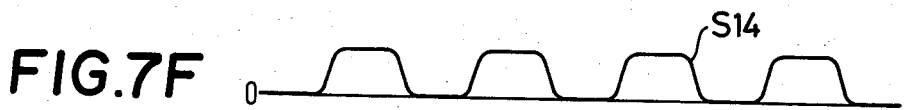
FIG.7F
FIG.7G
FIG.7H
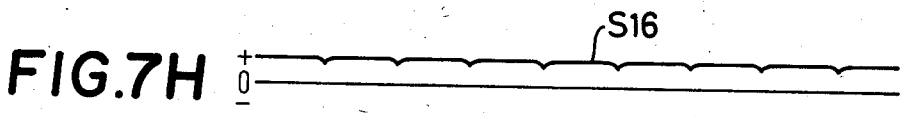

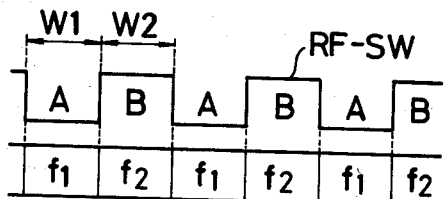
FIG.9A1
FIG.9B1
FIG.9A2
FIG.9B2
FIG.9A3
FIG.9B3
FIG.9A4
FIG.9B4
FIG.10
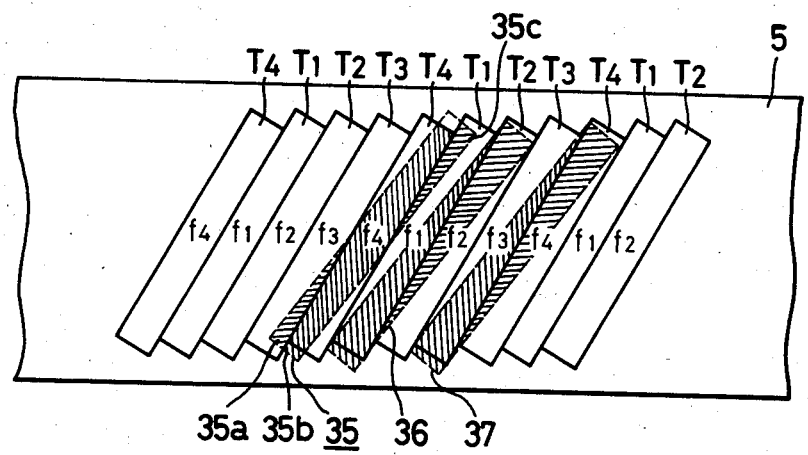

STILL IMAGE REPRODUCING APPARATUS

BACKGROUND OF THE INVENTION

1. Field of the Invention

The present invention relates to apparatus for reproducing a still picture from parallel tracks formed on a magnetic tape. More particularly, the present invention relates to a video recording apparatus of an automatic track following system (to be referred to as the ATF system hereinafter) wherein a plurality of pilot signals having mutually different frequencies are sequentially recorded together with an information signal, and the reproducing head is tracked along the respective tracks utilizing the pilot signals that are reproduced together with the information signal by the reproducing head.

2. Description of the Prior Art

In a video tape recorder (to be referred to as a VTR hereinafter), video information of one field is recorded in slanted parallel tracks on a magnetic tape by two rotary heads which rotate at a given speed relative to the magnetic tape. In the reproduction mode, the magnetic tape is driven at the same speed as that used in the recording mode, so that the video head correctly reproduces the slanted parallel signals recorded on the respective video tracks.

In order to obtain a still image, frame advance images or reverse frame advance images, the tape is stopped so that the two video heads A and B repetitively scan the corresponding tracks. However, when the tape is actually stopped at a desired position, the scanning track of the head often overlaps more than the desired two adjacent tracks, as indicated by the broken line in FIG. 1. The reproducing head scans across the recorded tracks along the arrow marked x, thereby crossing tracks A2 and A1, corresponding to the video head A and crossing track B1, corresponding to the other video head B. In head A scanning period W1 of a head change-over pulse signal RF-SW shown in FIG. 2B, when the head changes over from track A2 to A1, the desired video signal will not be reproduced at time AL, as shown in FIG. 2A. This lack of signal results in a noise pulse N being included in the reproduced video signal VD (FIG. 2C) of field WI. This is because the video signals are recorded using different azimuth angles in adjacent tracks so as to prevent crosstalk therebetween. If no steps are taken to deal with this lack of signal, a noise bar will be generated in fast forward images and in reverse images. A solution to this problem has therefore been desired.

A first approach to attempt to solve this problem has been to correct the positions of the heads A and B during one field scanning. According to this first approach, the video heads are mounted on a rotary drum using position control leafs such as bimorph elements, so that the head A can be positioned to correctly scan the tracks A1 and A2, and only head B scans the track B1. With this approach, a still image of good quality can be obtained. However, the configuration for mounting the heads A and B becomes complex, resulting in a high manufacturing cost.

A second approach to solving this problem is to control the timing for stopping the tape such that the scanning track of the head overlies two adjacent tracks equally, as shown in FIG. 3. When this mesure is taken, the point AL (FIG. 4A) at which the reproduced video signal is not obtained is shifted to a switching point, or a point close thereto, of the head change-over pulse RF-SW (FIG. 4B). This time point corresponds to a vertical blanking period of a demodulated or reproduced video signal VD (FIG. 4C). Accordingly, even if noise N is generated, such noise is hidden either above or below the actual image frame. Conventionally, this measure has been adopted in a VTR of the CTL tracking type, in which a control pulse (CTL pulse) corresponding to each track is recorded in a drive direction Y of the tape, and tracking control is performed using this CTL pulse. However, a practical working apparatus has not been proposed for use with a VTR of having the ATF system.

OBJECTS AND SUMMARY OF THE INVENTION

The present invention taken all of this into consideration and has for an object to provide, in a video recording apparatus using the ATF system, a still picture reproducing apparatus which is capable of stopping a recording medium at a selected and displaying a still position picture without any noise bars appearing on the screen.

In order to achieve the above object, in one aspect of the present invention, pilot signals are recorded on two adjacent tracks, and the recording medium is driven to a position at which the areas of the video heads opposing corresponding tracks become equal to each other, and then the recording medium is stopped and the still picture reproduced.

In another aspect of this invention, pilot signals having mutually different frequencies, which change in cyclical sequence from track-to-track, are recorded when the information signal is recorded, and a reference pilot signal generator produces signals of frequency corresponding to the frequency of the pilot signal reproduced from the track. The reference pilot signal associated with one track is then subtracted from the frequency of the pilot signal actually reproduced from the tracks and used to produce a control signal indicating the displacement of the head relative to the track being reproduced. The reference pilot signal generator is then controlled to produce alternately first and second frequency pilot signals having the same frequencies as the pilot signals, which were recorded in the pair of tracks to be reproduced in the still picture reproducing mode.

The above, and other objects, features, and advantages of the present invention will be apparent from the following detailed description of illustrated embodiments, which is to be read in connection with the accompanying drawings, in which the same refence numerals identify the corresponding elements and parts in the several views.

BRIEF DESCRIPTION OF THE DRAWING

FIG. 1 is a schematic representation of tracks formed on a magnetic tape and an area scanned by a reproducing head;

FIGS. 2A–2C are waveform diagrams representing the signals produced by a reproducing head scanning the tracks as shown in FIG. 1;

FIG. 3 is a schematic representation of tracks formed on a magnetic tape and the area scanned by a reproducing head following the teaching of the present invention;

FIGS. 4A–4C are waveform diagrams representing signals produced in connection with the representation of FIG. 3;

FIGS. 7A–7H are waveform and timing charts showing signals present at various points in the system of FIG. 5;

FIGS. 9A1–9B4 are timing charts useful in explaining the change-over of the pilot signal frequencies according to the present invention;

FIG. 10 is a schematic representation of tracks recorded on a magnetic tape and an area scanned by reproducing heads according to the present invention;

DETAILED DESCRIPTION OF THE PREFERRED EMBODIMENTS

An embodiment will now be described wherein the present invention is applied to a two-head helical scanning VTR of the ATF system.

The mode of operation of a tracking control apparatus of the ATF system will be described in relation to apparatus shown in FIG. 5, in which a reproduction output signal S1 from a rotary video head is supplied to a pilot signal detecting circuit 1 comprising a low pass filter. The detection circuit 1 produces a detected pilot signal S2 which is a reproduction of a pilot signal previously recorded on a magnetic tape. The detected pilot signal S2 is supplied to an error signal generator 3 that produces a tracking error signal S3 under the control of tracking signal generator 4.

Figure 6:
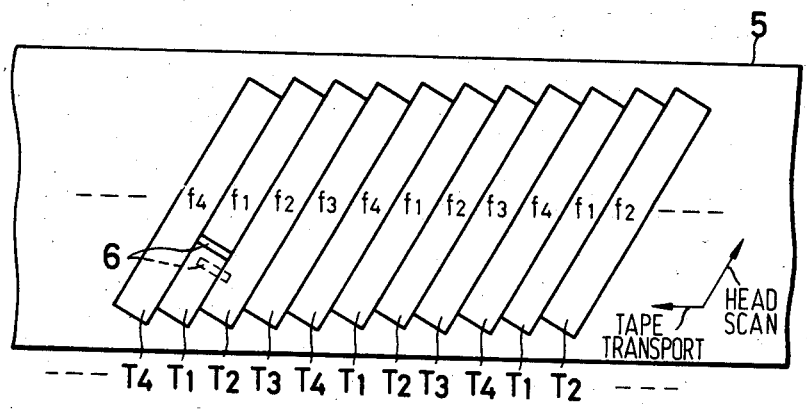
FIG. 6 is a schematic representation of a track pattern recorded on a magnetic tape.

As shown in FIG. 6, tape 5 has sequentially repetitively formed thereon a plurality of video tracks T1, T2, T3 and T4 which have four kinds of pilot signals f1, f2, f3 and f4 of different frequencies recorded thereon, respectively, the video tracks extending obliquely in mutually close relationship on tape 5. In this embodiment, the effective width of a video head which acts as a reproducing head 6 is selected, for example, to be substantially equal to the width of each of the tracks T1 to T4. As a result, when the reproducing head 6 properly tracks a track which is being currently scanned for reproduction (the track will be hereinafter called a reproduced track), only the pilot signals recorded on the particular track will be reproduced and consequently, a reproduction output will include only a single pilot frequency component therein. On the other hand, if the reproducing head 6 is displaced laterally relative to the track, then pilot signals recorded on another adjacent track on the right or left side of the reproduced track will also be reproduced and, accordingly, a reproduction output will include two pilot frequency components.

Frequencies f1 to f4 of the four pilot signals f1 to f4 are selected to be within a band well below color components which are converted into low frequencies (600 to 700 [kHZ]). The difference in frequency of pilot signals recorded on each of the odd-numbered tracks T1 and T3 of the cyclical four tracks T1 to T4 the frequency of pilot signals on another adjacent track on the right-hand side is selected to be $\Delta fA$, while the difference in frequency of pilot signals on each odd-numbered track T1, T3 from the frequency of pilot signals on another adjacent track on the left-hand side of the track is selected to be $\Delta fB$. Thus, the difference in frequency of pilot signals on each even-numbered track T2, T4 from pilot signals on another adjacent track on the right-hand side is $\Delta fB$ while the difference in frequency of the same from pilot signals on the left-hand side is $\Delta fA$.

Accordingly, if signals having a frequency $\Delta fA$ are included as a frequency component of pilot signals in reproduced signals when head 6 is reproducing an odd-numbered track T1, T3, then it proves that head 6 is in a rightwardly displaced position; on the other hand, if signals having a frequency $\Delta fB$ are included, then head 6 is in a leftwardly displaced position; and if no signals having either frequency $\Delta fA$ or $\Delta fB$ are included, it is apparent that proper tracking is maintained.

Similarly, if signals having a frequency $\Delta fB$ are included as a frequency component of pilot signals in reproduced signals when head 6 is reproducing an even-numbered track T2, T4, then it proves that head 6 is in a rightwardly displaced position; and on the other hand, if signals having a frequency $\Delta fA$ are included, head 6 is in a leftwardly displaced position.

In the present embodiment, frequencies f1, f2, f3 and f4 that are assigned to the first, second, third and fourth tracks T1, T2, T3 and T4, respectively, are selected to be f1=102 [kHZ]; f2=116 [kHZ]; f3 =160 [kHZ]; and f4=146 [kHZ], and hence the differences in frequency between $\Delta fA$ and $\Delta fB$ are:

$$\Delta fA = f1 - f2 = f3 - f4 = 14 \text{ [kHZ]} \tag{1}$$

$$\Delta fB = f2 - f3 = f1 - f4 = 44 \text{ [KHZ]} \tag{2}$$

Reproduction signals S1 obtained from head 6 are applied to pilot signal detecting circuit 1 constructed as a low pass filter in which pilot signals f1 to f4 are extracted as detected pilot signals S2 from the reproduction signals S1. The detected pilot signals S2 are fed to multiplier 14 as a first multiplication input and reference pilot signals S11 are fed from tracking signal generator 4 as a second multiplication input to multiplier 14.

The tracking signal generator 4 includes pilot frequency generating circuit 16 for generating four different pilot frequency outputs of frequencies f1 to f4, respectively, and a switching circuit 17 which receives the head change-over pulse signal RF-SW (FIG. 7A) whose logic level is changed each time two video heads associated with a rotary drum (not shown) are alternately rendered operative to scan the tape. It is to be understood that switching circuit 17 of the present embodiment includes a quaternary counter circuit which counts each time the level of the head change-over pulses changes. Thus, gate signals corresponding to the first to fourth tracks T1 to T4 are sequentially repetitively provided from the switching circuit 17. Gates are switched open by the gate signals for the tracks T1 to T4 so that the pilot frequency outputs f1 to f4 of the pilot frequency generating circuit 16, as shown by FIG. 7B are sequentially delivered as reference pilot signals S11.

It is to be noted that pilot frequency outputs f1 to f4 obtained at output terminals of the switching circuit 17 are delivered as pilot signals to a video head over a signal line 18. While the video head scans the first to fourth tracks T1 to T4, pilot signals of corresponding frequencies f1 to f4 are sequentially fed to the video head to record the pilot signals onto individual tracks T1 to T4.

Thus, if detected pilot signals S2 obtained at output terminals of the pilot signal detecting circuit 1 while the video head 6 is scanning the first to fourth tracks T1 to T4, respectively, are multiplied by a reference pilot signal S11 generated in synchronism with the currently reproduced track, then a multiplication output S12 is obtained thereby which includes a frequency corresponding to a difference between a frequency component included in the detected pilot signals S2 and a frequency of the reference pilot signals S11 when there is a tracking error (in fact, multiplication output S12 also includes other signal components). The multiplication output S12 is coupled to first and second difference frequency detecting circuits 20 and 21, respectively. When a signal component of the frequency difference $\Delta fA$, as determined by equation (1) hereinabove, is included in the multiplication output S12, it is extracted by first difference frequency detecting circuit 20 and is then converted into a direct current level by means of amplitude detector circuit 22, constructed as a rectifier circuit, to obtain the first error detection signal S13 of a direct current level. Similarly, when a signal component of the frequency difference $\Delta fB$, as determined by equation (2) hereinabove, is included in the multiplication output S12, it is extracted by second difference frequency detecting circuit 21 and is then converted into a direct current level by means of another amplitude detector circuit 23 to obtain a second error detection signal S14.

Thus, if head 6 is displaced rightwardly while it scans the first, second, third and fourth tracks T1, T2, T3 and T4 (that is, the switching circuit 17 outputs reference signals of frequencies f1, f2, f3, f4 at the appropriate times corresponding to tracks T1, T2, T3, T4), the detecting pilot signal S2 obtained from the reproduction output S1 of head 6 will include pilot signals of the frequencies f1 and f2, f2 and f3, f3 and f4, and f4 and f1, respectively, as shown by FIG. 7-C1. Accordingly, a signal will be produced as the multiplication output S12 which sequentially includes therein corresponding difference frequencies $\Delta fA$ (=f1−f2), $\Delta fB$ (=f2−f3), $\Delta fA$ (=f3−f4), and $\Delta fB$ (=f4−f1) as shown by FIG. 7-D1. On the other hand, if head 6 is in a leftwardly displaced position, the detected pilot signal S2 will sequentially include therein pilot signals of the frequencies f4 and f1, f1 and f2, f2 and f3, and f3 and f4, as shown by FIG. 7-C2. Accordingly, the multiplication output S12 will sequentially include therein the difference frequencies $\Delta fB$ (=f4−f1), $\Delta fA$ (=f1−f2), $\Delta fB$ (=f2−f3), and $\Delta fA$ (=f3−f4), respectively, as shown by FIG. 7-D2.

Thus, first and second error detection signals S13 and S14 having a direct current level which rises from 0 each time the track scanned by head 6 is changed over, as shown by FIGS. 7E and 7F (which shows, for example, a rightwardly displaced condition), can be obtained from amplitude detector circuits 22 and 23, respectively.

The first and second error detection signals S13 and S14 are fed to an adding input and a subtracting input, respectively, of subtracting circuit 24, which provides a subtraction output S15 that varies in level each time the first and second error detection signals S13 and S14 are alternately produced, as shown by FIG. 7G. The subtraction output S15 is fed directly to a first input terminal a1 of change-over switch circuit 25, and it is inverted in polarity by inverter circuit 26 and fed to a second input terminal a2 of change-over switch circuit 25. In response to a head change-over pulse RF-SW change-over switch 25 switches, to the first input terminal a1 when head 6 scans an odd-numbered track T1 or T3 or to second input terminal a2 when head 6 scans an even-numbered track T2 or T4. Thus, when head 6 is in a rightwardly displaced position, a positive DC level output S16, as shown by FIG. 7H, will be obtained. On the other hand, when head 6 is in a leftwardly displaced position, its DC level output S16 will have a negative polarity. This output signal S16 is fed to DC amplifier 27 that produces error signal S3. If head 6 is displaced, for example, rightwardly, then a signal component of the frequency difference $\Delta fA$ will appear at the output of multiplier circuit 14 when the reproduced track is of an odd number T1 or T3 and, hence, an output of first difference frequency detecting circuit 20 will be fed to subtracting circuit 24, and an error signal S16 of a positive DC level, will be produced, since change-over switch circuit 25 is switched to the first input terminal a1. Similarly, when the reproduced track is of an even number T2 or T4, a signal component of the frequency difference $\Delta fB$ will appear at the output of multiplier circuit 14 and an output from second difference frequency detecting circuit 21 will be coupled to subtracting circuit 24, which will produce a negative output, since change-over switch circuit 25 is switched to the second input terminal a2. The negative output of the subtracting circuit 24 will be inverted in polarity at the inverter circuit 26 and will ultimately result in an error signal S3 of a positive DC level.

As an example of using this error signal, if the error signal S3 is delivered as a correction signal to a phase servo tape speed control circuit of a capstan servo system, then the tape speed will be increased when the output of the subtracting circuit 24 is positive and it will be decreased when the output is negative, therefore the displacement between the video head and the reproduced track can be corrected or adjusted as necessary.

Figure 5:
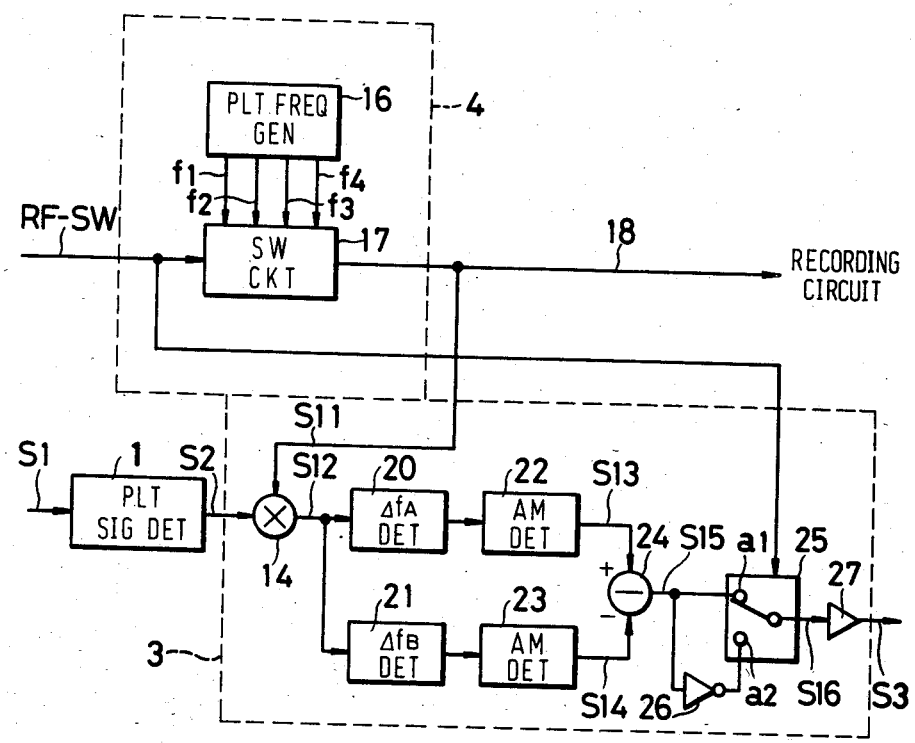
FIG. 5 is a block diagram of a tracking control device for an automatic track-following system according to the present invention.

In the above description of the embodiment shown in FIGS. 5 to 7, the width of the video head 6 is selected to be substantially equal to the track width. However, in practice, the width of the video head is greater than the track width. Accordingly, when the reproducing video head is performing correct tracking, the left and right sides of the head also overlie to a small extent the tracks to the right and left of the current track from which the signals are being reproduced. Nevertheless, the error signal components which correspond to rightward or leftward displacement, which are included in the error signal S3 and which are obtained from the pilot signals of these overlying portions, have opposite polarities and substantially the same magnitudes. Thus, these error signal components cancel each other, so that the apparatus operates according to the principle of the present invention.

In the apparatus of the configuration shown in FIG. 5, the difference frequencies ΔfA and ΔfB are obtained from the reproduced pilot signal. However, similar effects may be obtained by directly comparing the amplitudes of the pilot signals and deriving tracking error signals from such amplitude comparison.

Figure 8:
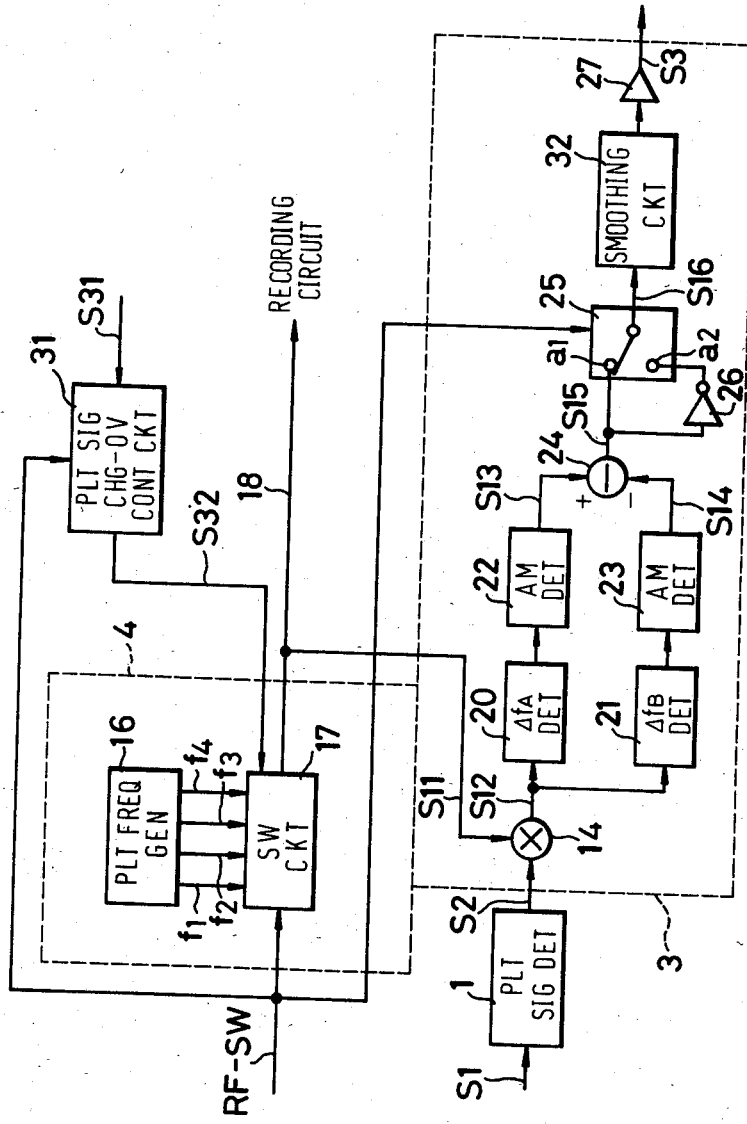
FIG. 8 is a block diagram of a further embodiment of a still-image reproducing system according to the present invention.

A still image reproducing apparatus of the present invention is shown in FIG. 8 in which the same reference numerals as used in FIG. 5 denote the same parts. The apparatus shown in FIG. 8 has a pilot signal change-over control circuit 31 associated with a tracking control device as described above. The pilot signal change-over control circuit 31 receives a still image mode designation signal S31 from a separate operation switch, and also receives a head change-over pulse RF-SW. The pilot signal change-over control circuit 31 produces a change-over control signal S32. When the contents of the still image mode designation signal S31 designate "frame advance image" or "reverse frame advance image", the change-over control signal S32 sequentially designates the four reference pilot signals from pilot frequency generator 16 to be fed from switch 17 as signal S11, each having a pair of frequencies of different combinations at predetermined intervals to be supplied to multiplier 14 in respective half cycles W1 and W2 of the head change-over signal RF-SW. Similarly, when the contents of the still image mode designation signal S31 designate "still image", pilot signal change-over control circuit 31 produces the change-over control signal S32 designating one of the four reference pilot signals without changing its frequency combination.

When "frame advance image" is designated, pilot signal change-over control circuit 31 causes switching circuit 17 to produce reference pilot signals S11 having frequencies f1 and f2, f3 and f2, f3 and f4, and f1 and f4 in respective half cycles W1 and W2 of a head change-over signal RF-SW (FIG. 7A) representing first through fourth designation modes, as shown in FIGS. 9A1 and 9B1, 9A2 and 9B2, 9A3 and 9B3, and 9A4 and 9B4, respectively. On the othr hand, when the "still image" is designated, pilot signal change-over control circuit 31 causes switching circuit 17 to produce a reference signal S11 of one of the pairs of frequencies f1 and f2, f3 and f2, f3 and f4, or f1 and f4, representing one of the first through fourth designation modes.

When the "still" key of the separate operation switch (not shown) is depressed and the contents of the still image mode designation signal S31 designate "still image", the tape drive mechanism temporarily stops the tape drive. Thereafter, the tape drive mechanism slowly drives the tape, using tracking error signal S3 from the error signal genertor 3, to a position where the noise bars are generated in or very near the vertical blanking period.

In this manner, the pilot signal change-over control circuit 31 causes the switching circuit 17 to supply a reference pilot signal S11 to multiplier 14. The reference pilot signal S11 has frequencies f1 and f2 at the timings of the scanning periods W1 and W2 of the video heads A and B, as shown in FIGS. 9A1 and 9B1.

Figure 11:
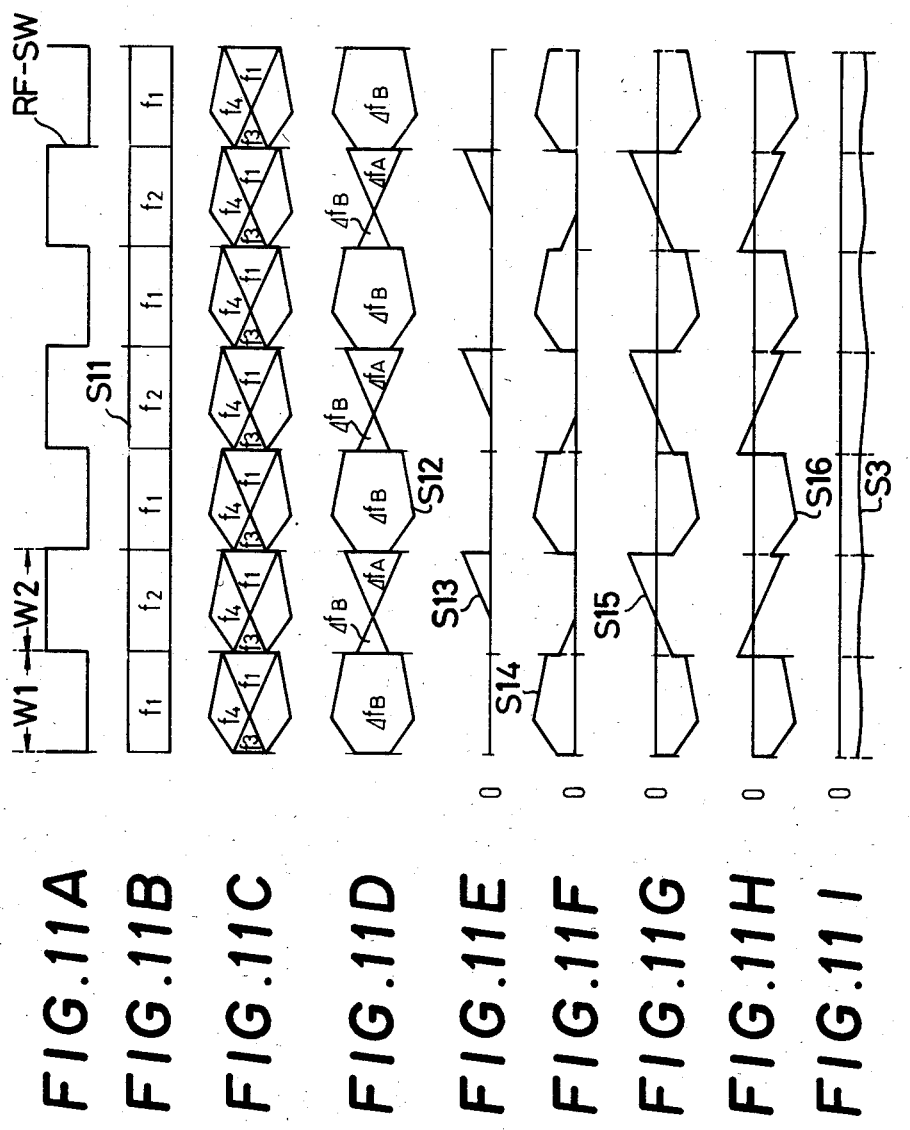
FIGS. 11A–11I are waveform diagrams of signals present at specific points in the system of FIG. 8.

In this mode, if tape 5 is at a position such that head 6 scans across the third, fourth and first tracks, T3, T4 and T1, as indicated by reference numeral 35 in FIG. 10, the length of the scanning track of head 6 opposing each of the tracks, T3, T4 and T1 varies over time as indicated by a hatched triangular portion 35a, a hatched hexagonal portion 35b, and another hatched triangular portion 35c, respectively. Accordingly, in the reproduction output S1 obtained by scanning one field with 6, as shown in FIG. 11C, the pilot signal component having a frequency f3 from the third track T3 decreases in a triangular form. After this signal component reaches 0 level, another pilot signal component having a freuency f1 from the first track T1 increases in a triangular form. Along with this change, a pilot signal component having a frequency f4 from the fourth track increases as the pilot signal component having the frequency f3 decreases, and then decreases as the pilot signal having the frequency f1 increases after the frequency f3 has reached 0 level. Thus, the pilot signal components change in a hexagonal form.

These changes in the reproduction output signal S1 and the signal components of the detected pilot signal S2 remain the same in the period W1 of the frequency f1 or the period W2 of the frequency f2. Thus, the difference frequencies ΔfA and ΔfB can be detected by the difference frequency detection circuits 20 and 21, as shown in FIG. 11D. In the period W1, the signal component having the difference frequency ΔfB ($=f1-f4$) is included in output S12 from the multiplier 14 based on the reproduced pilot signal component having the frequency f4. In the period W2, the signal components having the difference frequencies ΔfB and ΔfA are sequentially included in output S12 from the multiplier 14 based on the reproduced pilot signal components having the frequencies f3 and f1. Accordingly, amplitude detector circuit 22 connected to the output of first difference frequency detecting circuit 20 produces the first error detection signal S13, which is similar to that obtained by peak detection of the signal component of the difference frequency ΔfA of the multiplication output S12, as shown in FIG. 11E. Meanwhile, amplitude detector circuit 23 connected to the output of second difference frequency detecting circuit 21 produces the second error detection signal S14, which is similar to that obtained by peak detection of the signal component of the difference frequency ΔfB of the multiplication output S12, as shown in FIG. 11F.

The first error detection signal S13 is supplied to the adding or positive input terminal of subtracting circuit 24, while the second error detection signal S14 is supplied to the subtracting or negative input terminal of subtracting circuit 14, which produces at its output terminal a subtraction output S15 (FIG. 11G), which is similar to that obtained by superposing the waveform shown in FIG. 11F on that shown in FIG. 11E. Then, the waveform portion in the period W2 is inverted by the inverter circuit 26, and change-over switch circuit 25 produces a positive DC level output S16 (FIG. 11H).

As described with reference to FIG. 5, the positive DC level output S16 from change-over switch circuit 25 represents the tracking error, and the amount to be corrected is determined by the polarity and magnitude of the DC level. However, in the case shown in FIG. 8, the level of the positive DC level output S16 fluctuates significantly and, for this reason, the output S16 from which the tracking error signal S3 (FIG. 11I) must have the fluctuation component removed. The ripple is removed substantially from this DC level signal by smoothing circuit 32 connected between change-over switch 25 and DC amplifier 27. In the example being described, the tracking error signal S3 has a negative DC level which indicates that head 6 is displaced to the left of the normal tracking position.

Then, the tape drive mechanism slowly drives tape 5 (FIG. 10) to the left until the DC level of the tracking error signal S3 reaches 0 level. For this purpose, the tape can be driven slowly by the tape drive mechanism in one of the following manners. First, when the DC level of the tracking error signal S3 is negative, the mechanism drives the tape in the positive direction. Conversely, when the DC level of the tracking error signal S3 is positive, the mechanism drives the tape in the negative direction. Second, when the DC level of the tracking error signal S3 is not at 0 level, the tape is driven in one predetermined direction (positive or negative), and then the tape is stopped after the DC level reaches 0 level.

Figure 12:
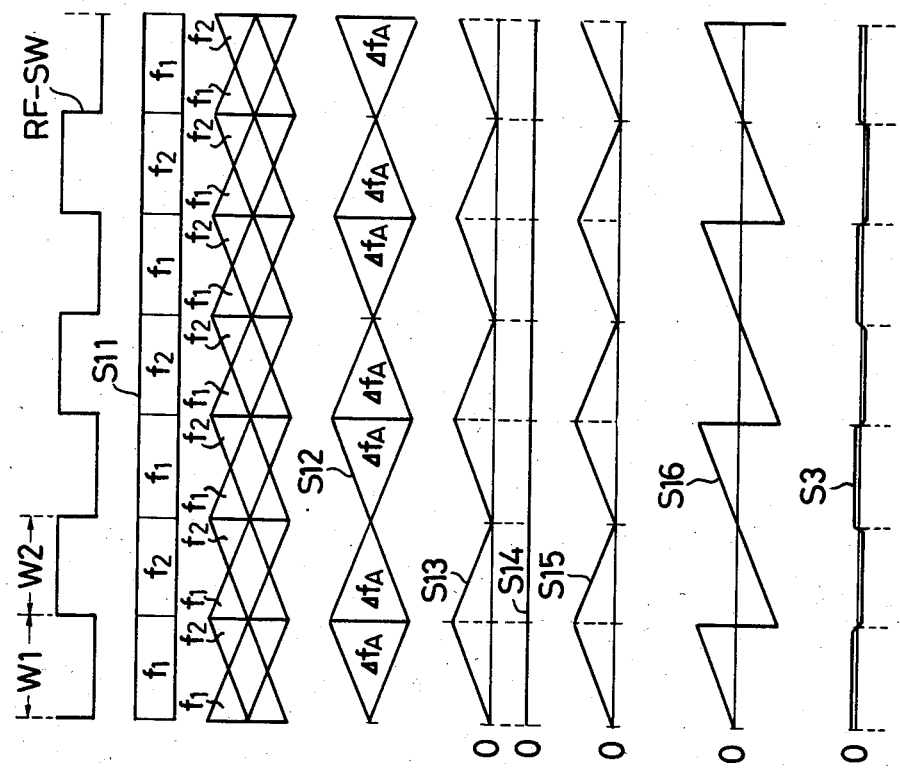
FIG. 12A–12I are waveform diagrams showing signals present at other specific points in the system of FIG. 8.

When tape 5 is slowly driven in this manner, the scanning track of head 6 is set such that the areas of the first and second tracks T1 and scanned by head 6 are equal to each other, as indicated by reference numeral 36 in FIG. 10. Then, the lengths of the portion of the scanning track of head 6 relative to the tracks T1 and T2, respectively, change in inverted triangular forms (FIG. 12C), and the elapsed time relationships are as shown in FIGS. 12A and 12I in correspondence with FIGS. 11A to 11I. In the scanning period W1 in which the reference pilot signal S11 having the frequency f1 is produced from switching circuit 17, the signal component of the difference frequency $\Delta fA$ ($=f1 - f2$) between the reference pilot signal S11 having the frequency f1 and the reproduced pilot signal S2 having the frequency f2 is included in the multiplication output S12 from multiplier 14. In the scanning period W2 in which the reference pilot signal S11 having frequency f2 is produced from the switching circuit 17, the difference frequency $\Delta fA$ ($=f1-f2$) between the reference pilot signal S11 having the frequency f2 and the reproduced pilot signal S2 having the frequency f1 is included in the multiplication output S12 from multiplier 14.

The subtracting circuit 24 receives as the first error detection signal S13 from first difference frequency detection circuit 20 a triangular wave signal, as shown in FIG. 12E, which is obtained by peak detection of the signal having the difference frequency $\Delta fA$. However, the second error detection signal S14 input to subtracting circuit 24 from second difference frequency detection circuit 21 remains at 0 level, as shown in FIG. 12F. Then, a subtraction output S15 having a positive DC level equivalent to that of the signal S13 appears at the output terminal of subtracting circuit 24, as shown in FIG. 12G. the waveform portion corresponding to the period W2 is inverted by change-over switch circuit 25, so that an AC output S16 which is inverted for each one-field scanning period W1 or W2 as shown in FIG. 12H is obtained.

When the areas of head 6 opposing the first and second tracks T1 and T2 are equal to each other, integrated values of the output S16 in the periods W1 and W2 have the same absolute values but have opposite polarities. Accordingly, the tracking error signal S3 appearing at the output terminal of smoothing circuit 32 is maintained at substantially 0 level.

In this state, since the tracking error signal S3 is at 0 level, the tape drive mechanism stops the tape. Then, head 6 reproduces the one-field video signal from the first track T1 by the head A in the scanning period W1 and then reproduces the one-field video signal from the second track T2 by the head B in the next scanning period W2, as has been described with reference to FIGS. 3 and 4. In this manner, the noise bars can be shifted to the change-over point or to the vicinity of the level of the head change-over signal RF-SW, and hence to the vertical blanking period or the vicinity thereof. The noise bars can thus be banished to the outside of the screen (upper or lower side thereof).

In the above description, the head is stopped on the first and second tracks T1 and T2. However, if the frequency of the reference pilot signal S11 is alternately set at f3 and f4 as shown in FIGS. 9A3 and 9B3, head 6 can be stopped on the third and fourth tracks T3 and T4, as indicated by reference numeral 37 in FIG. 10. Similarly, if the reference pilot signal S11 is alternately set at frequencies f3 and f2 or f1 and f4 as shown in FIGS. 9A2 and 9B2, and in FIGS. 9A4 and 9B4, respectively, head 6 can be stopped on the second and third tracks T2 and T3 or on the fourth and first tracks T4 and T1, respectively.

When the "frame advance key" is pressed by means of the separate operation switch and the contents of the still image mode designation signal S31 designate the "frame advance image" mode, the tape drive mechanism temporarily stops the tape and then commences the frame advance operation based on the tracking error signal S3, as will be described hereinafter.

First, pilot signal change-over control circuit 31 controls switching circuit 17 such that switching circuit 17 sequentially supplies to multiplier 14 a reference pilot signal S11 which alternately has frequencies f1 and f2 in the scanning periods W1 and W2, respectively, of the heads A and B, as shown in FIGS. 9A1 and 9B1. When pilot signal change-over control circuit 31 controls in this manner, as in the case of the "still image" mode as described above, head 6 stops on the first and second tracks T1 and T2. The head A scans the first track T1 and on the other hand the head B scans the second track T2, so that an image from which the noise bars have been expelled into the vertical blanking period can be obtained.

After a predetermined time has elapsed, pilot signal change-over control circuit 31 then controls switching circuit 17 such that switching circuit 17 supplies to multiplier 14 a reference pilot signal S11 (FIGS. 9A2 and 9B2) alternately having frequencies f3 and f4 in the scanning periods W1 and W2, respectively, of the heads A and B. Then, as in the case of the "still image" mode as described above, the head A scans the second track T2 while the head B scans the third track T3, so that an image from which the noise bars have been expelled into the vertical blanking period can be obtained.

In a similar manner, at predetermined time intervals, pilot signal change-over control circuit 31 changes over the frequency of the reference pilot signal S11 in the order of f3 and f4, f1 and f4, f1 and f2, f3 and f2, and so on. Then, the tape is sequentially and intermittently driven so that the head is sequentially stopped on the tracks T3 and T4, T4 and T1, T1 and T2, T2 and T3, and so on. In this manner, frame advance images can be obtained in which the still images as reproduced video signals are read out at predetermined intervals. Accordingly, the noise bars are eliminated from the reproduced images.

When the "reverse frame advance key" is pressed by means of a separate operation switch (not shown) and the contents of the still image mode designation signal S31 designate the "reverse frame advance" mode, pilot signal change-over control circuit 31 designates the frequency of the reference pilot signal S11 to be supplied from switching circuit 17 in the opposite order to that of the "frame advance image" mode, that is f1 and f2, f1 and f4, f3 and f4, f3 and f2, f1 and f2, and so on. At the same time, the tape drive mechanism reverses the driving direction of the tape from that in the "frame advance image" mode when the level of the tracking error signal S3 is other than 0. Then, in a similar manner to that for obtaining a still image, the tape is intermittently fed so that the head is stopped sequentially on corresponding tracks. A reproduced image free from noise bars can thus be obtained. Since the driving direction of the tape is opposite to that in the "frame advance image" mode, the reproduced image is a "reverse frame advance image".

Figure 13:
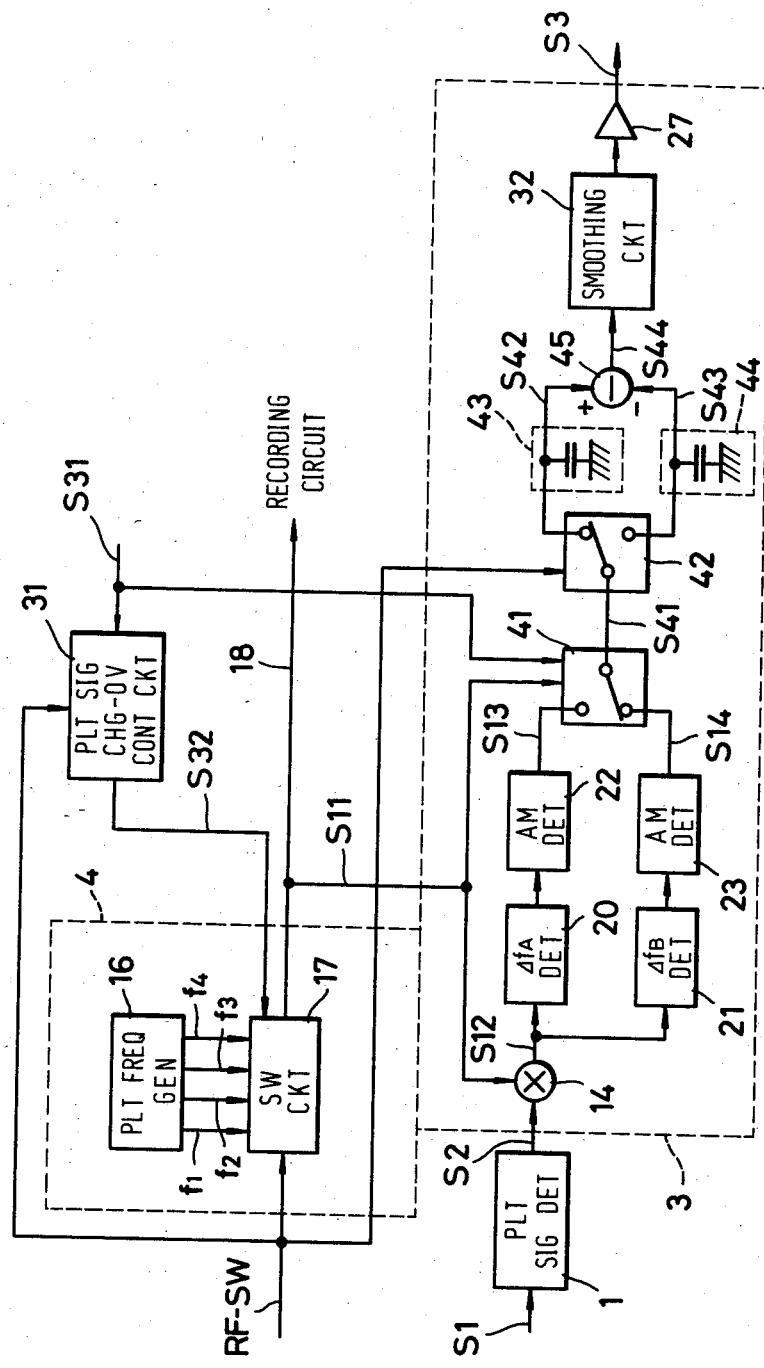
FIG. 13 is a block diagram showing another embodiment of a still-image reproducing system according to the present invention.

FIG. 13 shows another embodiment of the present invention, in which the same reference numerals as used in FIG. 8 denote the same parts. Outputs S13 and S14 from amplitude detector circuits 22 and 23 are coupled to selector switch 41. A selection output S41 from selector switch 41 is distributed to and stored in memories 43 and 44 through distributor 42. Memory outputs S42 and S43 are supplied to adding and subtracting input terminals, respectively, of subtracting circuit 45.

The selector 41 receives a still image mode designation signal S31 and a reference pilot signal S11 from switching circuit 17. When the frequency of the reference pilot signal S11 is alternately set at f1 and f2 or f3 and f4 (FIGS. 9A1 and 9B1 or FIGS. 9A3 and 9B3), selector 41 selects a DC level output S13 from amplitude detector circuit 22 corresponding to the difference frequency $\Delta fA$. When the frequency of the reference pilot signal S11 is alternately set at f3 and f2 or f1 and f4 (FIGS. 9A2 and 9B2 or FIGS. 9A4 and 9B4), selector 41 selects a DC level output S14 from amplitude detector circuit 23 corresponding to the difference frequency $\Delta fB$. In each case, selector 41 supplies the selected output S41 to distributor 42.

In response to a head change-over signal RF-SW, in the head A scanning period W1, distributor 42 distributes the output S41 from selector 41 to memory 43 at the adding input side of subtracting circuit 45. In the head B scanning period W2, distributor 42 supplies the output S41 from selector 41 to memory 44 at the subtracting input side of subtracting circuit 45.

In this embodiment, memories 43 and 44 comprise peak-holding capacitors and hold the peaks in the scanning periods W1 and W2, respectively.

In the embodiment shown in FIG. 13, in the modes shown in FIGS. 9A1 and 9B1 or FIGS. 9A3 and 9B3, selector 41 selects the output S13 corresponding to the difference frequency $\Delta fA$ and supplies it to distributor 42. At this time, the signal component of the difference frequency $\Delta fA$ is obtained in a manner as described above with reference to FIGS. 11 and 12. The peak value of this signal component obtained during an scanning period W1 is stored in memory 43. The peak value of the same signal component obtained during an scanning period W2 is stored in memory 44. The signal components of the difference frequency $\Delta fA$ become equal to each other in the scanning periods W1 and W2 when head 6 comes to a portion of the tape where the pilot signals having frequencies corresponding to those of the reference pilot signal S11 are stored as has been described with reference to FIG. 12. When head 6 opposes other portions of the tape, there is a difference between the signal components of the difference frequency $\Delta fA$ in the periods W1 and W2. Therefore, since there is a difference between the outputs S42 and S43 from the memories 43 and 44, a tracking error signal S3 is produced having a magnitude corresponding to a difference output S44 from subtracting circuit 45.

Accordingly, the tape drive mechanism drives the tape until the tracking error signal S3 reaches 0 level. When the tracking error signal S3 reaches 0 level, a state in which the signal components of the difference frequency $\Delta fA$ in the scanning periods W1 and S2 are equal to each other as in FIG. 12, may be obtained. Thus, noise can be banished to the vertical blanking period or the vicinity thereof and will not appear on the display screen.

In contrast to this, in the mode shown in FIGS. 9A2 and 9B2 or FIGS. 9A4 or 9B4, selector 41 selects the signal component having the difference frequency $\Delta fB$ and supplies it to distributor 42. In the same manner as described above, noise bars can be eliminated from the display screen.

In the embodiment having the configuration as shown in FIG. 13, a display image in which the noise bars do not appear may be obtained in accordance with the signal components having the difference frequencies $\Delta fA$ and $\Delta fB$ in the scanning periods W1 and W2, respectively, of the heads A and B. For this purpose, inverter circuit 26 in the embodiment shown in FIG. 3 can be omitted in this embodiment.

In the description made with reference to FIG. 13, memories 43 and 44 comprise peak-holding capacitors. These memories may alternatively be replaced by a circuit which integrate the peak values of the signal component of the difference frequency $\Delta fA$ and $\Delta fB$ in the periods W1 and W2. Still alternatively, the memories may sample the signal components at suitable timings and hold the sampled values.

When the "frame advance image" or "reverse frame advance image" mode is set in the embodiment shown in FIGS. 8 or 13, in the periods W1 and W2, pilot signal change-over control circuit 31 sets the frequency of the reference pilot signal S11 in the first mode of f1 and f2, the second mode of f2 and f3, the third mode of f3 and f4, and the fourth mode of f1 and f4, so that head 6 can stop on the tracks T1 and T2, T2 and T3, T2 and T4, and T4 and T1, respectively. However, head 6 may also stop on the tracks T3 and T4, T4 and T1, T1 and T2, and T2 and T3. For example, consider a case wherein the frequency of the reference pilot signal S11 is alternately set at f1 and f2 (FIG. 12B) as described with reference to FIG. 12, then when the head opposes the tracks T3 and T4, the state is established in which the frequency f1 is replaced by f3 and the frequency f2 is replaced by with reference to FIG. 12C. Accordingly, the signal components of the difference frequency $\Delta fB$ ($=f1-f4=f2-f3$) in the scanning intervals W1 and W2 are obtained at the output terminal of subtracting circuit 14, and the tracking error signal S3 reches 0 level in this case.

If the designation of the frequency of the reference pilot signal S11 alternates between two modes and the driving direction of the tape drive mechanism of the tape is predetermined in one direction, intermittent driving of the tape can be achieved. In this case, the frequency of the reference pilot signal S11 is set to alternate between the first mode (FIGS. 9A1 and 9B1) and the second mode (FIGS. 9A2 and 9B2), between the second mode and the third mode (FIGS. 9A3 and 9B3), between the third mode and the fourth mode (FIGS. 9A4 and 9B4), or between the fourth mode and the first mode.

When this measure is taken, the switching function and the configuration of pilot signal change-over circuit 31 can be simplified.

In the embodiments described above, error signal generator 3 constituting an ATF loop is directly utilized so as to obtain a tape drive signal (as a tracking error signal) for eliminating the noise bars from the screen. However, a similar effect may be obtained by incorporating an exclusive tape drive signal generator of the same configuration as that of error signal generator 3.

In summary, according to the present invention, frequency of the reference pilot signals is set properly for reproducing a still image so as to drive a tape such that noise bars are eliminated from the display screen. Accordingly, the image quality of a still image in a video recording apparatus of the ATF system can be improved.

The above description relates to a single preferred embodiment of the present invention, however, it will be apparent that many modifications and variations can be effected by one skilled in the art without departing from the spirit and scope of the novel concepts of the present invention, wherein the scope of the invention may be determined only by the appended claims.

We claim:

1. Apparatus for use in reproducing a still picture from information signals recorded in a series of oblique tracks arranged adjacent each other on a magnetic record medium, said tracks having also recorded therein pilot signals of mutually different frequencies changing cyclically from track to track, comprising:
    magnetic head means for reproducing signals recorded in said tracks on said magnetic record mediums;
    pilot signal detecting means for producing a detected pilot signal from said signals reproduced by said magnetic head means;
    tracking signal generator means producing a reference pilot signal having a cyclically changing frequency equal at any time to one of said mutually different frequencies of said pilot signals; and
    error signal generator means receiving said detected pilot signal and said reference pilot signal for producing therefrom a control signal representing relative displacement of said reproducing head from the track being reproduced, said error signal generator means including a signal multiplier for multiplying said detected pilot signal with said reference pilot signal and producing a multiplication output signal including a difference between a frequency component included in said detected pilot signal and a frequency of said reference pilot signal when said head is not aligned with said track being reproduced.

2. Apparatus for use in reproducing a still picture according to claim 1, in which said magnetic head means includes at least two magnetic heads for scanning said tracks on said magnetic record medium and said tracking signal generator means includes a pilot frequency generator producing signals having corresponding first, second, third, and fourth frequencies, respectively, sequentially fed to said error generator means in response to a rate at which said at least two scanning heads scan said magnetic record medium.

3. Apparatus according to claim 1, in which said error signal generator means includes difference frequency detecting means for detecting first or second difference frequencies in said multiplication output signal.

4. Apparatus according to claim 3, in which said error signal generator means includes a subtracting circuit connected to subtract said second difference frequency signal from said first difference frequency signal for producing a difference signal therefrom fed to a first input of a switch and to an inverter means for inverting same, the output signal of said inverter means being fed to a second input of said switch, said switch being operable in response to a change-over signal for changing over from one magnetic head to the other.

5. Apparatus according to claim 4, further comprising a smoothing circuit connected to the output of said switch.

6. Apparatus according to claim 1, further comprising a signal change-over control circuit receiving a head change-over signal and responsive to a mode designation signal for producing a change-over control signal fed to said tracking signal generator for controlling the frequencies of said reference pilot signal.

7. Apparatus according to claim 1, in which said magnetic head means includes at least two magnetic heads for alternately scanning said tracks and said tracking signal generator means includes a pilot signal frequency generator producing signals having correspoonding first, second, third, and fourth frequencies, respectively, within a frequency band below 600 kHZ and having a frequency spacing between said second and third frequencies greater than a frequency spacing between said first and second frequencies or said third and fourth frequencies, said signals of said first, second, third, and fourth frequencies being fed to a switching circuit for selecting one thereof in response to a head change-over signal indicative of the head that is in contact with magnetic recording medium.

8. Apparatus for controlling the tracking position of a magnetic head that reproduces signals from a series of oblique, parallel tracks formed on a magnetic tape, each of the tracks containing a video signal and a pilot signal, in which the pilot signals in adjacent tracks have mutually different frequencies that change in a cyclic sequence from track to track, comprising:
    reference pilot-signal generator means generating reference pilot signals having frequencies that are the same as the pilot signals recorded in said tracks;
    pilot-signal detector means for detecting the pilot signal in the track being reproduced; and
    tracking-error means receiving said pilot signal detected from said track being reproduced and said reference pilot signal then being generated and producing a tracking-error signal having a magnitude representing the difference between the frequency of said reference pilot signal and said detected pilot signal for controlling the tracking position of said magnetic head, said tracking-error means including a signal multiplier for multiplying said detected pilot signal with said reference pilot signal and producing a multiplication output signal including a difference between a frequency component included in said detected pilot signal and a frequency of said reference pilot signal, when said head is out of alignment with said track being reproduced.

9. Apparatus according to claim 8, in which there are at least two magnetic head means being controlled and said tracking-signal generator means includes a pilot frequency generator producing signals having corresponding first, second, third, and fourth frequencies, respectively, sequentially fed to a switch means for selecting one of said frequencies depending upon the head in contact with said tape.

10. Apparatus according to claim 8, in which said tracking error means includes difference frequency detecting means for detecting first or second difference frequencies in said multiplication output signal.

11. Apparatus according to claim 10, in which said tracking error means includes a subtracting circuit connected to subtract said second difference-freuency signal from said first difference-frequency signal for producing a difference signal therefrom fed to a switching means and to an inverter means for inverting same and feeding the inverted difference signal to a second input of said switching means for selectively producing an output therefrom, said switching means being operable in response to a head change-over signal also fed to said magnetic heads.

12. Apparatus according to claim 11, further comprising a smoothing circuit connected to said output of said switching means.

13. Apparatus according to claim 8, further comprising a signal change-over control circuit receiving a head change-over signal and a mode designation signal for producing a change-over control signal fed to said tracking signal generator for controlling the frequency of said reference pilot signal.

* * * * *